United States Patent
Fuchs et al.

(10) Patent No.: US 10,152,607 B2
(45) Date of Patent: Dec. 11, 2018

(54) SECURE ACCESS TO HIERARCHICAL DOCUMENTS IN A SORTED, DISTRIBUTED KEY/VALUE DATA STORE

(71) Applicant: A9.com, Inc., Palo Alto, CA (US)

(72) Inventors: Adam P. Fuchs, Arlington, MA (US); Christopher B. McCubbin, Milton, MA (US); Luke Brassard, Belmont, MA (US)

(73) Assignee: A9.com Inc., Palo Alto, CA (US)

( * ) Notice: Subject to any disclaimer, the term of this patent is extended or adjusted under 35 U.S.C. 154(b) by 732 days.

(21) Appl. No.: 14/298,890

(22) Filed: Jun. 7, 2014

(65) Prior Publication Data

US 2014/0365527 A1  Dec. 11, 2014

Related U.S. Application Data (60) Provisional application No. 61/832,454, filed on Jun. 7, 2013.

(51) Int. Cl.
   *G06F 21/62* (2013.01)
(52) U.S. Cl.
   CPC .. *G06F 21/6227* (2013.01); *G06F 2221/2145* (2013.01)
(58) Field of Classification Search
   CPC .................................................. G06F 21/6227
   USPC ....................................................... 707/786
   See application file for complete search history.

(56) References Cited

U.S. PATENT DOCUMENTS

| | | | | |
|---|---|---|---|---|
| 6,593,943 B1 * | 7/2003 | MacPhail | .......... | G06F 17/30905 345/440 |
| 7,664,751 B2 * | 2/2010 | O'Sullivan | ......... | G06F 17/3087 707/783 |
| 2003/0196108 A1 * | 10/2003 | Kung | ................. | H04L 63/0823 726/6 |
| 2005/0240572 A1 * | 10/2005 | Sung | ................. | G06F 17/30011 |
| 2006/0059567 A1 * | 3/2006 | Bird | .................... | G06F 12/1466 726/27 |
| 2007/0255698 A1 * | 11/2007 | Kaminaga | ......... | G06F 17/30522 |
| 2008/0021837 A1 * | 1/2008 | Chang | .................... | G06F 21/73 705/58 |
| 2009/0063951 A1 * | 3/2009 | Rjaibi | ............... | G06F 17/30923 715/234 |
| 2013/0054976 A1 * | 2/2013 | Brown | ................ | G06F 21/6218 713/189 |

(Continued)

*Primary Examiner* — Jensen Hu
(74) *Attorney, Agent, or Firm* — Nicholson De Vos Webster & Elliott, LLP (57) ABSTRACT

Policy-based, cell-level access control is provided in association with a sorted, distributed key-value data store. As data representing a hierarchical document is ingested into the data store, the data is interpreted to identify fields and any sub-fields in the document, each identified field and its associated protection level as identified are translated into a set of one or more fieldname and visibility label pairs. Each fieldname and visibility label pair has a fieldname identifying a field and its zero or more sub-fields, together with a visibility label that is a function of the associated protection levels of the field and any sub-fields therein. At query time, and in response to receipt of a query including an authorization label, the fieldname and visibility labels are applied against the authorization label in the query to control which fields in the document are retrieved and used to generate the response to the query.

20 Claims, 4 Drawing Sheets

(56) References Cited

U.S. PATENT DOCUMENTS

| | | | | |
|---|---|---|---|---|
| 2013/0124545 | A1* | 5/2013 | Holmberg | G06F 17/30244 707/756 |
| 2014/0067819 | A1* | 3/2014 | Novoselsky | G06F 17/30923 707/741 |
| 2014/0373176 | A1* | 12/2014 | Arning | G06F 21/6218 726/28 |

* cited by examiner

SECURE ACCESS TO HIERARCHICAL DOCUMENTS IN A SORTED, DISTRIBUTED KEY/VALUE DATA STORE

BACKGROUND

Technical Field

This application relates generally to secure, large-scale data storage and, in particular, to database systems providing fine-grained access control.

Brief Description of the Related Art

"Big Data" is the term used for a collection of data sets so large and complex that it becomes difficult to process (e.g., capture, store, search, transfer, analyze, visualize, etc.) using on-hand database management tools or traditional data processing applications. Such data sets, typically on the order of terabytes and petabytes, are generated by many different types of processes.

Big Data has received a great amount of attention over the last few years. Much of the promise of Big Data can be summarized by what is often referred to as the five V's: volume, variety, velocity, value and veracity. Volume refers to processing petabytes of data with low administrative overhead and complexity. Variety refers to leveraging flexible schemas to handle unstructured and semi-structured data in addition to structured data. Velocity refers to conducting real-time analytics and ingesting streaming data feeds in addition to batch processing. Value refers to using commodity hardware instead of expensive specialized appliances. Veracity refers to leveraging data from a variety of domains, some of which may have unknown provenance. Apache Hadoop™ is a widely-adopted Big Data solution that enables users to take advantage of these characteristics. The Apache Hadoop framework allows for the distributed processing of Big Data across clusters of computers using simple programming models. It is designed to scale up from single servers to thousands of machines, each offering local computation and storage. The Hadoop Distributed File System (HDFS) is a module within the larger Hadoop project and provides high-throughput access to application data. HDFS has become a mainstream solution for thousands of organizations that use it as a warehouse for very large amounts of unstructured and semi-structured data.

In 2008, when the National Security Agency (NSA) began searching for an operational data store that could meet its growing data challenges, it designed and built a database solution on top of HDFS that could address these needs. That solution, known as Accumulo, is a sorted, distributed key/value store largely based on Google's Bigtable design. In 2011, NSA open sourced Accumulo, and it became an Apache Foundation project in 2012. Apache Accumulo is within a category of databases referred to as NoSQL databases, which are distinguished by their flexible schemas that accommodate semi-structured and unstructured data. They are distributed to scale well horizontally, and they are not constrained by the data organization implicit in the SQL query language. Compared to other NoSQL databases, Apache Accumulo has several advantages. It provides fine-grained security controls, or the ability to tag data with security labels at an atomic cell level. This feature enables users to ingest data with diverse security requirements into a single platform. It also simplifies application development by pushing security down to the data-level. Accumulo has a proven ability to scale in a stable manner to tens of petabytes and thousands of nodes on a single instance of the software. It also provides a server-side mechanism (Iterators) that provide flexibility to conduct a wide variety of different types of analytical functions. Accumulo can easily adapt to a wide variety of different data types, use cases, and query types. While organizations are storing Big Data in HDFS, and while great strides have been made to make that data searchable, many of these organizations are still struggling to build secure, real-time applications on top of Big Data. Today, numerous Federal agencies and companies use Accumulo.

While technologies such as Accumulo provide scalable and reliable mechanisms for storing and querying Big Data, there remains a need to provide enhanced enterprise-based solutions that seamlessly but securely integrate with existing enterprise authentication and authorization systems, and that enable the enforcement of internal information security policies during database access.

BRIEF SUMMARY

This disclosure describes a method for secure access to hierarchical documents (e.g., JSON, XML, or the like) in association with a sorted, distributed key-value data store in which keys comprise an n-tuple structure that includes a key-value access control. As data representing a hierarchical document is ingested into the data store, the data is interpreted to identify fields and any subfields in the document, each identified field and its associated protection level as identified are translated into a set of one or more fieldname and visibility label pairs. Each fieldname and visibility label pair has a fieldname identifying a field and its zero or more subfields, together with a visibility label that is a function of the associated protection levels of the field and any subfields therein. At query time, and in response to receipt of a query including an authorization label, the fieldname and visibility labels are applied against the authorization label in the query to control which fields in the document are retrieved and used to generate the response to the query.

During ingest (storage), preferably each identified field in the hierarchical document is translated into a pair {fieldname, fieldvalue}, where fieldname is an ordered list of element pairs of {element name, element label} consisting of all the ancestors of a field in order and the field itself last. The fieldname uniquely identifies a field in the hierarchical document. Preferably, the derived visibility label of the fieldname then is a conjunction of the element labels of all of the element pairs in the fieldname, namely: (label1) AND (label2) AND (label3) . . . AND (label n). As the hierarchical document is ingested, the document is interpreted as a collection of these {fieldname, fieldvalue} pairs, where each fieldname is labeled with the derived label. Preferably, the pairs and security labels then are stored together as triples of {fieldname, fieldvalue, visibility label}. Preferably, the system also derives at least one index based on the interpreted hierarchical documents. The triples and index entries may then be stored in the data store.

At query time, a query is received by the system. The query is associated with the hierarchical document that has been ingested (interpreted, indexed, etc.) and stored in the data store in the manner described above. The query includes an authorization label set. In a first embodiment (that does not involve use of any derived index), the authorization label set in the received query is applied against the visibility labels in the data store to control which fields in the hierarchical document(s) are retrieved. A response to the query (if the query is not rejected) then includes the fieldvalues for these fields. In a second embodiment (that does involve use of a derived index), the index is query in response to receipt of the query. When querying the index, the authorization label set in the query is applied against the visibility labels in the index entries.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
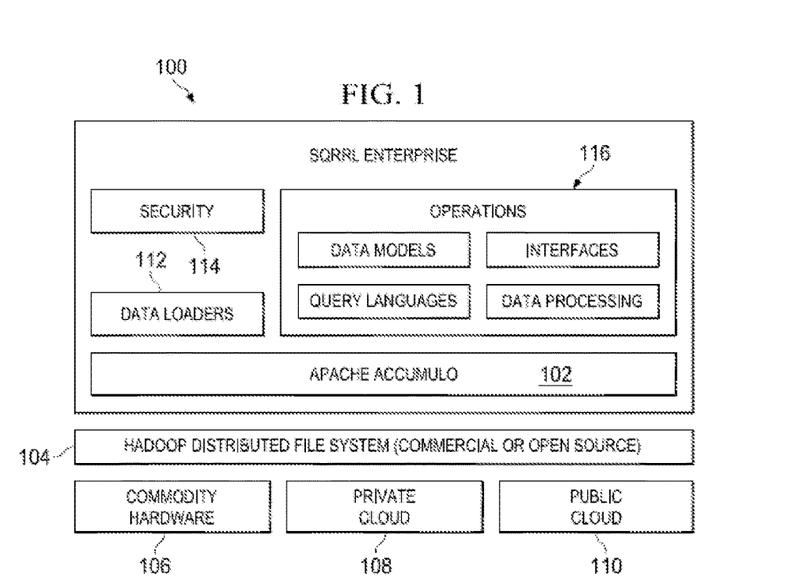
FIG. 1 depicts the technology architecture for an enterprise-based NoSQL database system according to this disclosure.

FIG. 1 represents the technology architecture for an enterprise-based database system of this disclosure. As will be described, the system 100 of this disclosure preferably comprises a set of components that sit on top of a NoSQL database, preferably Apache Accumulo 102. The system 100 (together with Accumulo) overlays a distributed file system 104, such as Hadoop Distributed File System (HDFS), which in turn executes in one or more distributed computing environments, illustrated by commodity hardware 106, private cloud 108 and public cloud 110. Sgrrl™ is a trademark of Sqrrl Data, Inc., the assignee of this application. Generalizing, the bottom layer typically is implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). A cloud platform may comprise co-located hardware and software resources, or resources that are physically, logically, virtually and/or geographically distinct. Communication networks used to communicate to and from the platform services may be packet-based, non-packet based, and secure or non-secure, or some combination thereof.

Referring back to FIG. 1, the system components comprise a data loader component 112, a security component 114, and an analytics component 116. Generally, the data loader component 112 provides integration with a data ingest service, such as Apache Flume, to enable the system to ingest streaming data feeds, such as log files. The data loader 112 can also bulk load JSON, CSV, and other file formats. The security component 114 provides data-centric security at the cell-level (i.e., each individual key/value pair is tagged with a security level). As will be described in more detail below, the security component 114 provides a labeling engine that automates the tagging of key/value pairs with security labels, preferably using policy-based heuristics that are derived from an organization's existing information security policies, and that are loaded into the labeling engine to apply security labels at ingest time. The security component 114 also provides a policy engine that enables both role-based and attribute-based access controls. As will also be described, the policy engine in the security component 114 allows the organization to transform identity and environmental attributes into policy rules that dictate who can access certain types of data. The security component 114 also integrates with enterprise authentication and authorization systems, such as Active Directory, LDAP and the like. The analytics component 116 enables the organization to build a variety of analytical applications and to plug existing applications and tools into the system. The analytics component 116 preferably supports a variety of query languages (e.g., Lucene, custom SQL, and the like), as well as a variety of data models that enable the storage of data as key/value pairs (native Accumulo data format), as graph data, and as JavaScript Object Notation (JSON) data. The analytics component 116 also provides an application programming interface (API), e.g., through Apache Thrift. The component 116 also provides real-time processing capabilities powered by iterators (Accumulo's native server-side mechanism), and an extensible indexing framework that indexes data upon.

Figure 2:
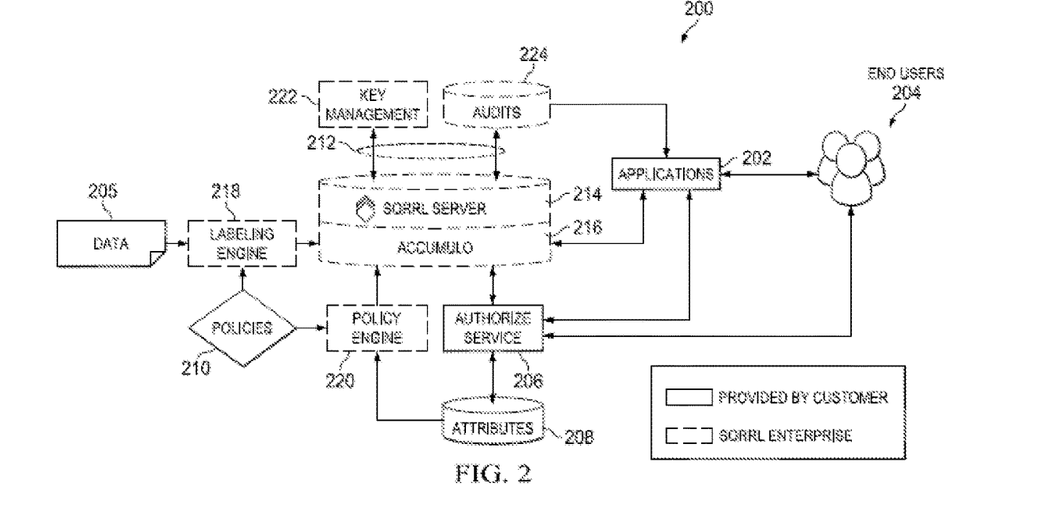
FIG. 2 depicts the architecture in FIG. 1 in an enterprise to provide identity and access management integration according to this disclosure.

FIG. 2 depicts the architecture in FIG. 1 integrated in an enterprise to provide identity and access management according to an embodiment of this disclosure. In this embodiment, it is assumed that the enterprise 200 provides one or more operational applications 202 to enterprise end users 204. An enterprise service 206 (e.g., Active Directory, LDAP, or the like) provides identity-based authentication and/or authorization in a known manner with respect to end user attributes 208 stored in attributed database. The enterprise has a set of information security policies 210. To provide identity and access management integration, the system 212 comprises server 214 and NoSQL database 216, labeling engine 218, and policy engine 220. The system may also include a key management module 222, and an audit sub-system 224 for logging. The NoSQL database 216, preferably Apache Accumulo, comprises an internal architecture (not shown) comprising tablets, tablet servers, and other mechanisms. The reader's familiarity with Apache Accumulo is presumed. As is well-known, tablets provide partitions of tables, where tables consist of collections of sorted key-value pairs. Tablet servers manage the tablets and, in particular, by receiving writes from clients, persisting writes to a write-ahead log, sorting new key-value pairs in memory, periodically flushing sorted key-value pairs to new files in HDFS, and responding to reads from clients. During a read, a tablet server provides a merge-sorted view of all keys and values from the files it created and the sorted in-memory store. The tablet mechanism in Accumulo simultaneously optimizes for low latency between random writes and sorted reads (real-time query support) and efficient use of disk-based storage. This optimization is accomplished through a mechanism in which data is first buffered and sorted in memory and later flushed and merged through a series of background compaction operations. Within each tablet a server-side programming framework (called the Iterator Framework) provides user-defined programs (Iterators) that are placed in different stages of the database pipeline, and that allow users to modify data as it flows through Accumulo. Iterators can be used to drive a number of real-time operations, such as filtering, counts and aggregations.

The Accumulo database provides a sorted, distributed key-value data store in which keys comprises a five (5)-tuple structure: row (controls atomicity), column family (controls locality), column qualifier (controls uniqueness), visibility label (controls access), and timestamp (controls versioning). Values associated with the keys can be text, numbers, images, video, or audio files. Visibility labels are generated by translating an organization's existing data security and information sharing policies into Boolean expressions over data attributes. In Accumulo, a key-value pair may have its own security label that is stored under the column visibility element of the key and that, when present, is used to determine whether a given user meets security requirements to read the value. This cell-level security approach enables data of various security levels to be stored within the same row and users of varying degrees of access to query the same table, while preserving data confidentiality. Typically, these labels consist of a set of user-defined labels that are required to read the value the label is associated with. The set of labels required can be specified using syntax that supports logical combinations and nesting. When clients attempt to read data, any security labels present in a cell are examined against a set of authorizations passed by the client code and vetted by the security framework. Interaction with Accumulo may take place through a query layer that is implemented via a Java API. A typical query layer is provided as a web service (e.g., using Apache Tomcat).

Referring back to FIG. 2, and according to this disclosure, the labeling engine 218 automates the tagging of key-value pairs with security labels, e.g., using policy-based heuristics. As will be described in more detail below, these labeling heuristics preferably are derived from an organization's existing information security policies 210, and they are loaded into the labeling engine 218 to apply security labels, preferably at the time of ingest of the data 205. For example, a labeling heuristic could require that any piece of data in the format of "xxx-xx-xxxx" receive a specific type of security label (e.g., "ssn"). The policy engine 220, as will be described in more detail below as well, provides both role-based and attribute-based access controls. The policy engine 220 enables the enterprise to transform identity and environmental attributes into policy rules that dictate who can access certain types of data. For example, the policy engine could support a rule that data tagged with a certain data-centric label can only be accessed by current employees during the hours of 9-5 and who are located within the United States. Another rule could support a rule that only employees who work for HR and who have passed a sensitivity training class can access certain data. Of course, the nature and details of the rule(s) are not a limitation.

The process for applying these security labels to the data and connecting the labels to a user's designated authorizations is now described. The first step is gathering the organization's information security policies and dissecting them into data-centric and user-centric components. As data 205 is ingested, the labeling engine 218 tags individual key-value pairs with data-centric visibility labels that are preferably based on these policies. Data is then stored in the database 216, where it is available for real-time queries by the operational application(s) 202. End users 204 are authenticated and authorized to access underlying data based on their defined attributes. For example, as an end user 204 performs an operation (e.g., performs a search) via the application 202, the security label on each candidate key-value pair is checked against the set of one or more data-centric labels derived from the user-centric attributes 208, and only the data that he or she is authorized to see is returned.

Figure 3:
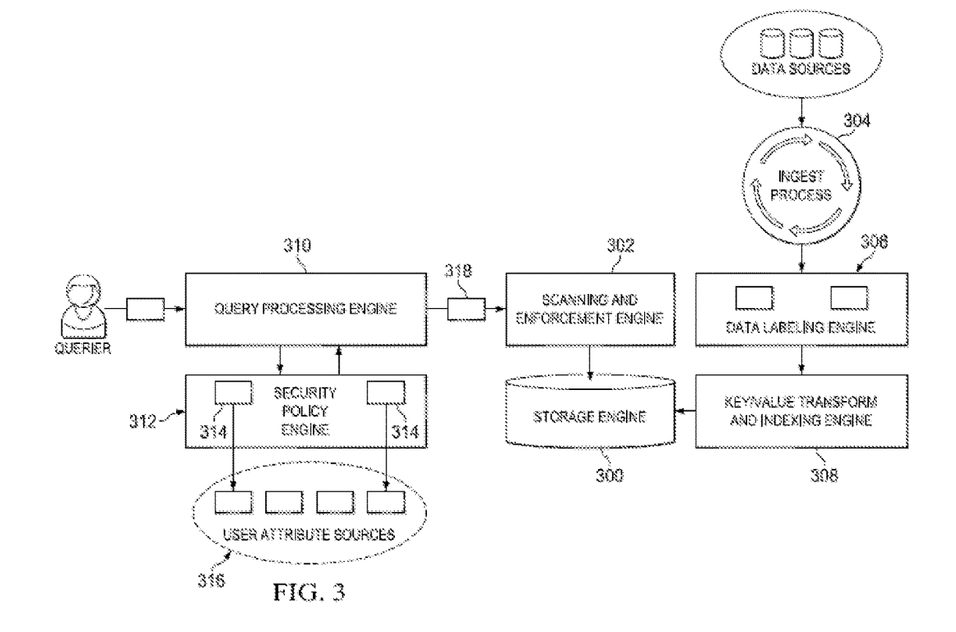
FIG. 3 depicts the main components of the solution shown in FIG. 2.

FIG. 3 depicts the main components of the solution shown in FIG. 2. As illustrated, the NoSQL database (located in the center) comprises a storage engine 300, and a scanning and enforcement engine 302. In this depiction, the ingest operations are located on the right side and comprise ingest process 304, data labeling engine 306, and a key-value transform and indexing engine 308. The left portion of the diagram shows the query layer, which comprises a query processing engine 310 and the security policy engine 312. The query processing engine 310 is implemented in the server in FIG. 2. As described above, as data is ingested into the server, individual key-value pairs are tagged with a data-centric access control and, in particular, a data-centric visibility label preferably based on or derived from a security policy. These key-value pairs are then stored in physical storage in a known manner by the storage engine 300.

At query time, and in response to receipt of a query from a querier, the query processing engine 310 calls out to the security policy engine 312 to determine an appropriate set of data-centric labels to allow the query to use if the query is to be passed onto the Accumulo database for actual evaluation. The query received by the query processing engine may include a set of one or more data-centric labels specified by the querier, or the query may not have specified data-centric labels associated therewith. Typically, the query originates from a human at a shell command prompt, or it may represent one or more actions of a human conveyed by an application on the human's behalf. Thus, as used herein, a querier is a user, an application associated with a user, or some program or process. According to this disclosure, the security policy engine 312 supports one or more pluggable policies 314 that are generated from information security policies in the organization. When the query processing engine 310 receives the query (with or without the data-centric labels), it calls out to the security policy engine to obtain an appropriate set of data-centric labels to include with the query (assuming it will be passed), based on these one or more policies 314. As further illustrated in FIG. 3, during this call-out process, the security policy engine 312 in turn may consult with any number of sources 316 for values of user-centric attributes about the user, based on the one or more pluggable policies 312 supported by the security policy engine. If the query is permitted (by the query processing engine) to proceed, the query 318 (together with the one or more data-centric labels) then is provided by the query processing engine 310 to the scanning and enforcement engine 302 in the NoSQL database. The scanning and enforcement engine 302 then evaluates the set of one or more data-centric labels in the query against one or more data-centric access controls (the visibility labels) to determine whether read access to a particular piece of information in the database is permitted. This key-value access mechanism (provided by the scanning and enforcement engine 302) is a conventional operation.

Figure 4:
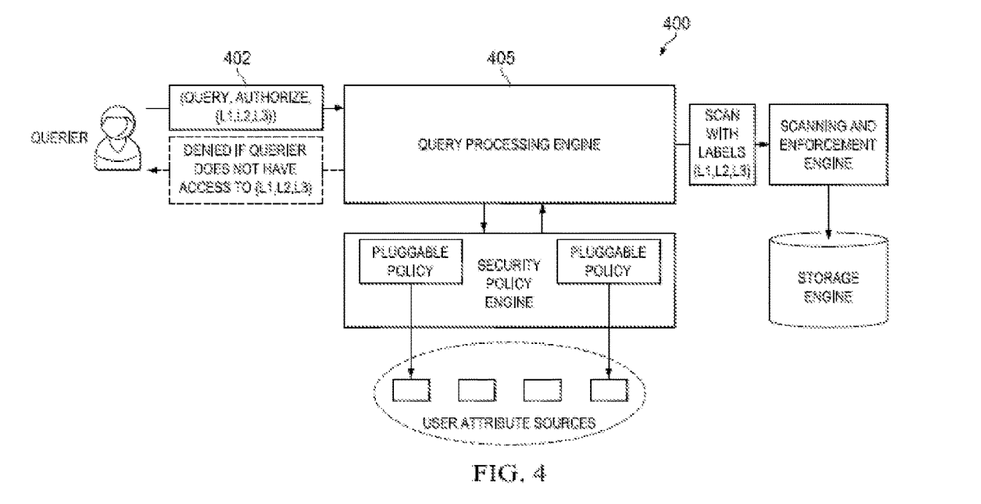
FIG. 4 illustrates a first use case wherein a query includes specified data-centric labels.
Figure 5:
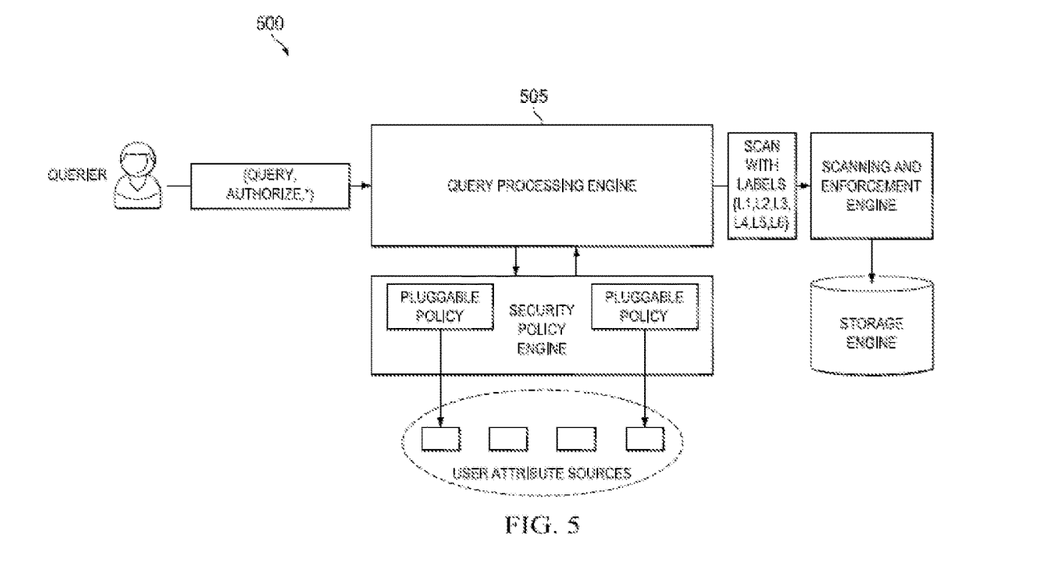
FIG. 5 illustrates a second use wherein a query does not include specified data-centric labels.

The query processing engine typically operates in one of two use modes. In one use case, shown in FIG. 4, the query 400 (received by the query processing engine) includes one or more specified data-centric labels 402 that the querier would like to use (in this example, L1-L3). Based on the configured policy or policies, the query processing engine 405 determines that the query may proceed with this set (or perhaps some narrower set) of data-centric labels, and thus the query is passed to the scanning and processing engine as shown. In the alternative, and as indicated by the dotted portion, the query processing engine 405 may simply reject the query operation entirely, e.g., if the querier is requesting more access than they would otherwise properly be granted by the configured policy or policy. FIG. 5 illustrates a second use case, wherein the query 500 does not included any specified data-centric labels. In this example, once again the query processing engine 505 calls out to the security policy engine, which in turn evaluates the one or more configured policies to return the appropriate set of data-centric labels. In this scenario, in effect the querier is stating it wants all of his or her entitled data-centric labels (e.g., labels L1-L6) to be applied to the query; if this is permitted, the query includes these labels and is once again passed to the scanning and processing engine.

Figure 6:
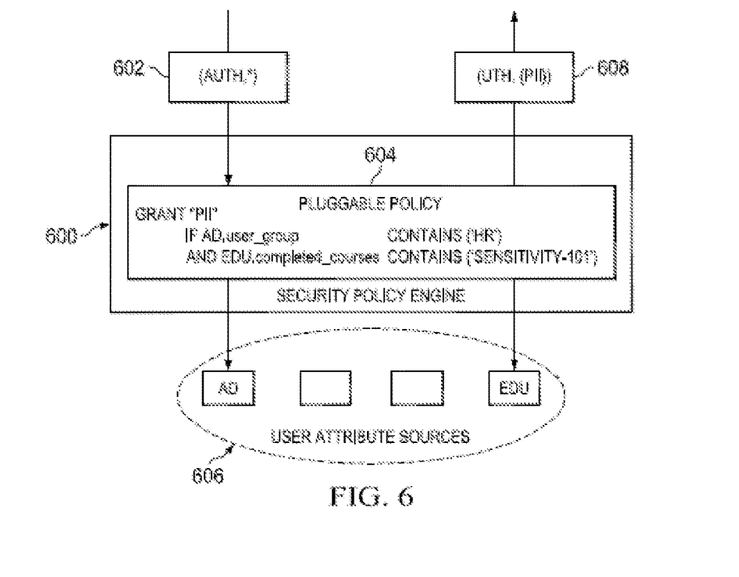
FIG. 6 illustrates a basic operation of the security policy engine.

FIG. 6 illustrates the basic operation of the security policy engine. In this example, the query 602 does not specify any data-centric labels. The security policy engine 600 includes at least one pluggable security policy 604 that is configured or defined, as will be explained in more detail below. In general, a pluggable policy takes, as input, user-centric attributes (associated with a user-centric realm), and applies one or more policy rules to generate an output in the form of one or more data-centric attributes (associated with a data-centric realm). As noted above, this translation of user-centric attribute(s) to data-centric label(s) may involve the security policy engine checking values of one or more user attribute sources 606. Generalizing, a "user-centric" attribute typically corresponds to a characteristic of a subject, namely, the entity that is requesting to perform an operation on an object. Typical user-centric attributes are such attributes as name, data of birth, home address, training record, job function, etc. An attribute refers to any single token. "Data-centric" attributes are associated with a data element (typically, a cell, or collection of cells). A "label" is an expression of one or more data-centric attributes that is used to tag a cell.

In FIG. 6, the pluggable policy 604 enforces a rule that grants access to the data-centric label "PII" if two conditions are met for a given user: (1) the user's Active Directory (AD) group is specified as "HR" (Human Resources) and, (2) the user's completed courses in an education database EDU indicate that he or she has passed a sensitivity training class. Of course, this is just a representative policy for descriptive purposes. During the query processing, the policy engine queries those attribute sources (which may be local or external) and makes (in this example) the positive determination for this user that he or she meets those qualifications (in other words, that the policy rule evaluates true). As a result, the security policy engine 600 grants the PII label. The data-centric label is then included in the query 608, which is now modified from the original query 602. If the user does not meet this particular policy rule, the query would not include this particular data-centric label.

The security policy engine may implement one or more pluggable policies, and each such policy may include one or more policy rules. The particular manner in which the policy rules are evaluated within a particular policy, and/or the particular order or sequence of evaluating multiple policies may be varied and is not a limitation. Typically, these considerations are based on the enterprise's information security policies. Within a particular rule, there may be a one-to-one or one-to-many correspondence between a user-centric attribute, on the one hand, and a data-centric label, on the other. The particular translation from user-centric realm to data-centric realm provided by the policy rule in a policy will depend on implementation.

Secure Access to Hierarchical Documents

With the above as background, the subject matter of this disclosure is now described.

According to this disclosure, the key-value transform and indexing engine 308 (FIG. 3) includes an interpreter that interprets hierarchical document labels and propagates those labels through a document hierarchy. The interpreter preferably is implemented in software (as a set of computer program instructions) executing in a hardware processor. The following section provides additional details regarding this subject matter and, in particular, how it can be used to facilitate fine-grained access control. As will be seen, this benefit is achieved, in part, by identifying different levels of hierarchies (e.g., fields) in a document and authorization labels that may be associated with different levels. Data corresponding to the different fields are stored in the scalable data access system under different attributes (e.g., columns). Moreover, preferably the authorization labels are modified to account for the hierarchy of the fields, and the authorization mechanism of the data access system/database is provided with the modified authorization labels. Thus, the underlying data model of the data access system remains unmodified and simple, but access to different levels of hierarchies, such as subfields of a hierarchical document, can be controlled in an efficient manner using the modified authorization labels.

In general, and by way of additional background, a hierarchical document is any collection of information that is organized as a hierarchy (e.g., having a parent, and related child nodes or elements) and encapsulated in a document. Common file formats for hierarchical documents include, without limitation, the Extensible Markup Language (XML) and JavaScript Object Notation (JSON). These documents can be static, in which they are written once and immutable from that point, or dynamic, in which they are formed through a series of edits. As noted above, a visibility label is typically an expression that describes requirements that must be satisfied to gain read access to a particular piece of information. Visibility labels typically include users' roles or attributes as well as provenance elements of the data that they protect. In Accumulo, as described above, these labels are in the form of Boolean expressions over authorizations, such as "(A&(B|C))" the operator "&" representing a logical AND operation and the operator "|" representing the logical OR operation. These labels may be checked against user authorizations at query time, so a user with authorization set {A,B} would be granted read access to the data protected by label "(A&(B|C))," while a user with authorization set {B,C} would not be granted read access. A fine-grained access control database supports preserves data confidentiality by maintaining labels on data elements and checking those labels against a user's credentials at query time. The granularity of such a database is determined by the amount of data that is covered by a given label. A coarse-grained access control database may support labeling at the database or table level, while a fine-grained access control database may support labeling at the row or cell level. Accumulo, as noted, supports labeling at the cell level. Used in connection with such databases, inverted indexing is an indexing technique that supports rapid lookup of a value and maps the value back to the documents and fields of those documents that contain that value.

Figure 7:
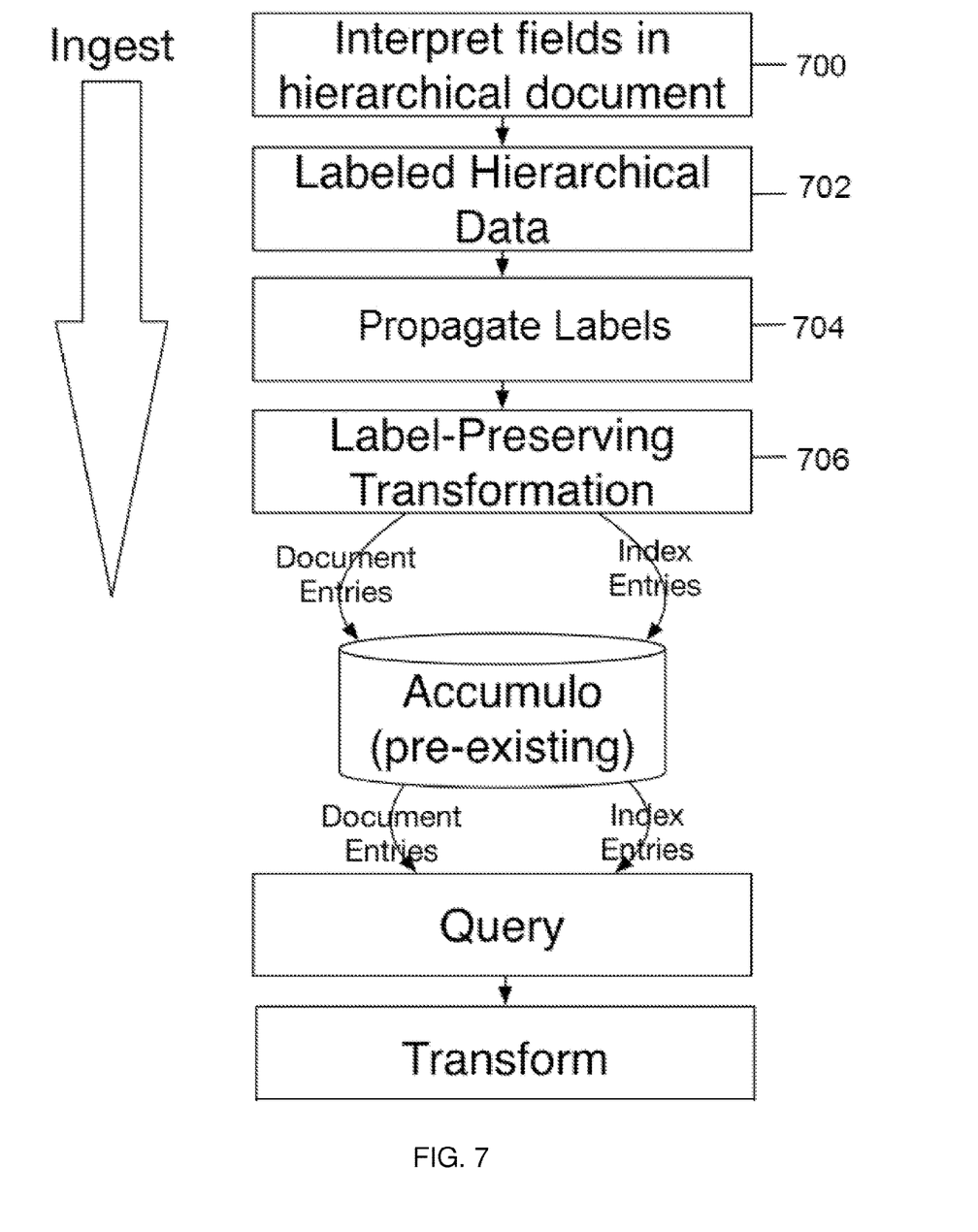
FIG. 7 illustrates further details of the key-value transform and indexing engine with respect to storing and managing hierarchical documents according to this disclosure.

With reference now to FIG. 7, in one embodiment, the tasks performed in storing (ingesting) a hierarchical document into the data store include the following operations. In step 700, one or more fields in a hierarchical document are interpreted as fieldname+visibility/authorization label. In the case of JSON, these two elements may be parsed out of the single string representing the field. This interpretation maintains JSON format compatibility. In step 702, the visibility/authorization label detected in step 700 is translated into the protection mechanism supported by a fine-grained access control database (e.g., Accumulo) using a simple data model. This operation will be described in more detail below. Steps 700 and 702 as described above may be carried out independently or as an integrated operation. At step 704, the labels are propagated through the document hierarchy; this preserves the labels through the field hierarchy such that a field is releasable for a given query only when all of its labeled ancestors are releasable. At step 706, the hierarchical document is transformed into one or more indexed forms, such as forward indices and numerical range indexes, such that: (a) the index is represented in a fine-grained access control database using a simple data model, and (b) the information contained in any given field is protected in the index of the database at the same level as the field. Preferably, the operations occur during ingest into the data store of the hierarchical document.

Thus, according to this disclosure, the transform and indexing engine 308 interprets fields in hierarchical documents as field name and visibility/authorization label. The visibility/authorization label detected is translated into the protection mechanism supported by the database using a simple data model. The engine preserves the labels through the field hierarchy, such that a field is releasable for a given query only when all of its labeled ancestors are releasable. It transforms hierarchical documents into indexed forms, such as forward indices and numerical range indexes, such that the index is represented in the database using the data model, and the information contained in any given field is protected in the index of the database at the same level as the field.

The translation of the visibility/authorization label supports multiple fields with the same fieldname that are protected by different visibility labels. For example, two different fields may have the same name "phone number," and each of those fields may hold the same or different phone numbers. The visibility label associated with one of those fields may be "public" while the label associated with the other field may be "private." The two fields and the associated labels along with any other labels corresponding to the hierarchy of those fields are provided to the database. During access, based on the authorization label provided in the query, different fields from the document may be retrieved.

Preferably, the tasks performed in retrieving a hierarchical document and/or hierarchical fields thereof, from the database employs a simple data model that decomposes queries of hierarchical documents into two components, namely: functions over fields, which are used to determine which fields contribute to the result, and sets of authorizations, which are used to determine which field are allowed to contribute to the result. These operations occur during the query processing, which has been described above generally with respect to FIGS. 4 and 5 by way of examples. Based on these decompositions, one or more indices, such as forward indices, inverted indices, and numerical range indexes, may be generated to access a field and/or a value specified in the query. As noted above, these indices are represented in a fine-grained access control database using a simple data model. Multiple fields with the same name that are visible at query time may be collapsed into a single, merged version. This merge is integrated into a processing language, such as SQL, so as to reduce the complexity.

The following provide examples of the above-described approach in association with a preferred data model.

Consider a hierarchical document identified by a Universal Unique Identifier (UUID) and expressed as:

doc1 =
{"field1@[admin]":{"subfield1":"value1","subfield2@[private]":"value2"}}.

In this example, the hierarchical document has one or more fields (such as "field1"), and each such field may include one or more subfields (such as "subfield1" and "subfield2" associated with field1). Each field or subfield has (or may have) a protection level, as well as a "value." In this example, the protection level for "field1" is [admin], meaning that the field can only viewed by an entity with administrative credentials. The subfield2 has a [private] protection level, meaning that the field can only be viewed if the appropriate private protection level is received in the query. The subfield1 does not include a protection level (in this example). Subfield1 includes the value1, and subfield2 includes the value2. The field itself (field1) has a value that comprises the values of the identified subfields. Each subfield's textual name is referred to as an element name, and each subfield's label is an element label. This nomenclature is not intended to be limiting.

When steps 700 and 702 are carried out, preferably each identified field is translated into a pair {fieldname, fieldvalue}, where fieldname is an ordered list of element pairs of {element name, element label} consisting of all the ancestors of a field in order and the field itself last. The fieldname uniquely identifies a field in the hierarchical document. Preferably, the derived visibility label of the fieldname then is a conjunction of the element labels of all of the element pairs in the fieldname, namely: (label1) AND (label2) AND (label3) . . . AND (label n). Other mathematical operators may be used to derive the visibility label of the fieldname if desired. As the hierarchical document is ingested into the system, the document is interpreted as a collection of these {fieldname, fieldvalue} pairs, where each fieldname is labeled with the derived label. Preferably, the pairs and security labels then are stored together as triples of {fieldname, fieldvalue, visibility label}. A similar ingest process occurs for other hierarchical documents.

Preferably, the system also derives an index based on the interpreted hierarchical documents. Thus, for example, one derived index may include ordered entries such as: {term, fieldname, UUID, visibility label}, in which the "term" is derived from the original field, and the visibility label is identical to that given to the interpreted triple. This is an "inverted" index. Other derived indexes may include other collections of the items in the triples. The index entries preferably are also stored in the data store.

At query time, a query is received by the system, as has been previously described. In this embodiment, it is assumed that the query is associated in some way with the hierarchical document that has been ingested (interpreted, indexed, etc.) and stored in the data store in the manner described above. The query includes an authorization label set, such as label set 402 described above with respect to FIG. 4.

In a first embodiment (that does not involve use of any derived index), the authorization label set in the received query is applied against the visibility labels in the data store to control which fields in the hierarchical document(s) are retrieved. A response to the query (if the query is not rejected) then includes the fieldvalues for these fields.

In a second embodiment (that does involve use of a derived index), the index is query in response to receipt of the query. When querying the index, the authorization label set in the query is applied against the visibility labels in the index entries.

In another embodiment, an in lieu of storing the triples themselves, only the inverted index entries are stored in the data store, in which case the query response is compiled solely by using those entries.

To provide a concrete example, and given the sample hierarchical document referenced above, the interpretation step detects the fields and protection levels (authorization labels), and the translation step yields the following triples: fieldname: {field1,admin}, fieldvalue: object, visibility label: admin fieldname: {field1,admin} {subfield1,empty}, fieldvalue: value1, visibility label: admin fieldname: {field1, admin} {subfield2,private}, fieldvalue: value2, visibility label: (admin & private) The "fieldvalue" represents any data stored at the address: UUID:fieldname. Here, "field1@[admin]" is a fully qualified fieldname with a single element, usually referred to by shorthand as "field1".

The following are several sample queries given these triples.

A query for "doc1/field1/subfield2" with authorization set {admin, private} returns "value2." A query for "doc1/field1/subfield2" with authorization set {private}, however, returns nothing, even though this subfield exists because the authorization provided in the query is inadequate. A query for "doc1/field1/subfield2" with authorization set {admin} also returns nothing, and a query for "doc1/field1/subfield2" with authorization set { } returns nothing, as well.

A query for "value2" with authorization set {admin, private} generates an inverted index for "doc1/field1/subfield2" and returns {doc1}. A query for "value2" with authorization set {admin}, however, returns nothing. Similarly, a query for "value2" with authorization set {private} returns nothing, and a query for "value2" with authorization set { } also returns nothing.

A query for "field1/subfield2:value2" with authorization set {admin, private} returns {doc1}, but a query for "field1/subfield2:value2" with authorization set {admin} returns nothing. A query for "field1/subfield2:value2" with authorization set {private} also returns nothing. In this case, even though the authorization label associated with subfield2, i.e., private, is provided in the query, the translated authorization label associated with subfield2 is (admin & private), and the query did not include the authorization label "admin." A query for "field1/subfield2:value2" with authorization set { } also returns nothing.

A query/command Fetch doc1 with authorization set {admin, private} returns '{"field1@[admin]":{"subfield1": "value1","subfield2 @[private]":"value2"}}.' A query/command Fetch doc1 with authorization set {admin} returns '{"field1@[admin]":{"subfield1":"value1"}},' but not "subfield2 @[private]":"value2." A query/command Fetch doc1 with authorization set {private} returns '{ },' i.e., nothing, because the authorization "admin" required by all hierarchies is not provided, and a query/command Fetch doc1 with authorization set { } also returns '{ }.'

The following provides additional details regarding support of a hierarchical data model that stores full metadata content of hierarchical data sources, such as JSON. A UUID (Universal Unique Identifier) is an identifier for a document and its contents within a dataset. UUIDs are unique in a single dataset, and a UUID can be any string. A UUID may be re-used across different datasets. Typically, each dataset contains a set of documents, each identified by the UUID as noted. Each document can consist of one or more fields; individual fields point at a specific piece of data. Available basic data types are similar to those found in JSON (e.g., OBJECT, ARRAY, BOOLEAN, FLOAT, INTEGER, STRING), plus several additional types: BINARY and NULLTYPE. There may also be aggregate types that include SUM, MIN, MAX, FIRST, LAST and SUM_OF_SQUARES. Objects and arrays generally have no data directly association with them, as they contain other types. By default, numbers in standard JSON documents are treated as FLOAT type. Each field can be identified by its hierarchy of Elements. Elements themselves either can be a named string or an index into an array. For example, a field can be identified by the following logical path: parent, children, [$1^{st}$ entry], name, where the first, second and fourth entries are named strings and the third entry is an array index. This logical path can be represented in several ways. The system then allows direct access to individual fields using an XPath-like syntax, such as "parent/children [0]/name." In this data model, hierarchical fields can represent tabular data by using simple single-element field names.

Preferably, field names are strongly typed. In addition to a path of elements, each field has a type associated with it. There are two main groups of types, which include basic and aggregate field types. The type that is declared for a given field defines what information should be encoded into its binary data portion. Most of the basic types resemble those used by the JSON specification. The aggregate field types can be used as counters that are calculated at query time.

The above-described technique provides many advantages. The approach takes Accumulo's native cell-level security capabilities and integrates with commonly-used identity credentialing and access management systems, such as Active Directory and LDAP. The enterprise-based architecture described is useful to securely integrate vast amounts of multi-structured data (e.g., tens of petabytes) onto a single Big Data platform onto which real-time discovery/search and predictive analytic applications may then be built. The security framework described herein provides an organization with entirely new Big Data capabilities including secure information sharing and multi-tenancy. Using the described approach, an organization can integrate disparate data sets and user communities within a single data store, while being assured that only authorized users can access appropriate data. This feature set allows for improved sharing of information within and across organizations.

The above-described architecture may be applied in many different types of use cases. General (non-industry specific) use cases include making Hadoop real-time, and supporting interactive Big Data applications. Other types of real-time applications that may use this architecture include, without limitation, cybersecurity applications, healthcare applications, smart grid applications, and many others.

The approach herein is not limited to use with Accumulo; the security extensions (role-based and attribute-based access controls derived from information policy) may be integrated with other NoSQL database platforms. NoSQL databases store information that is keyed, potentially hierarchically. The techniques herein are useful with any NoSQL databases that also store labels with the data and provide access controls that check those labels.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with any application layer protocols, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The platform functionality may be co-located or various parts/components may be separately and run as distinct functions, in one or more locations (over a distributed network).

What is claimed is as follows:

1. A method in software executed by one or more computing devices operative in association with a sorted, distributed key-value data store, comprising:
    as data representing a hierarchical document identified by a unique identifier is ingested into the data store,
        identifying fields and any subfields in the hierarchical document;
        translating each identified field and its associated protection level into a set of one or more triples, each triple having a fieldname identifying a field and its zero or more ancestor fields, a fieldvalue, and a visibility label that indicates an expression based on a protection label of the field and protection labels of any ancestor fields of the field; and
        storing in the data store the set of one or more triples or an index derived from the set of one or more triples;
    in response to receipt of a query associated with the hierarchical document, the query including an authorization label set, applying the visibility labels against the authorization label set to control which fields in the hierarchical document are retrieved; and
    returning a response to the query, the response including the fieldvalue of at least one field due to the authorization label set satisfying the expression indicated by the triple corresponding to the field.

2. The method as described in claim 1 wherein the fieldname for each of the set of triples is an ordered list of element pairs {element name, element label} for ancestors of a field and the field itself, wherein the visibility label of the fieldname is a conjunction of the element labels of all of the element pairs in the fieldname.

3. The method as described in claim 1 further including deriving an index from a collection of the set of one or more triples, the index comprising a set of index entries, each index entry containing a visibility label that is identical to the visibility label in the triple from which it was derived.

4. The method as described in claim 3 wherein the index is an inverted index and the index entries comprise a set of entries: {term, fieldname, unique identifier, and visibility label}.

5. The method as described in claim 1 wherein the at least set of one or more triples are stored in the data store, and wherein during the applying step the visibility labels in the triples are applied against the authorization label set in the query.

6. The method as described in claim 3 wherein the at least the index derived from the set of one or more triples is stored in the data store, and wherein during the applying step the visibility labels in the index are applied against the authorization label set in the query.

7. The method as described in claim 1 wherein the unique identifier is a universally unique identifier (UUID) that is unique for the hierarchical document and its contents.

8. An apparatus operating in association with a sorted, distributed key-value data store, comprising:
  at least one processor;
  a computer memory holding computer program instructions executed by the at least one processor to cause the apparatus to:
    ingest data representing a hierarchical document identified by a unique identifier into the data store, wherein to ingest the data the apparatus is to interpret the data to identify fields and any subfields in the hierarchical document;
    translate each identified field and its associated protection level into a set of one or more triples, each triple having a fieldname identifying a field and its zero or more ancestor fields, a fieldvalue, and a visibility label that indicates an expression based on a protection label of the field and protection labels of any ancestor fields of the field; and
    store in the data store the set of one or more triples or an index derived from the set of one or more triples;
    in response to receipt of a query associated with the hierarchical document, the query including an authorization label set, apply the visibility labels against the authorization label set to control which fields in the hierarchical document are retrieved; and
    return a response to the query, the response including the fieldvalue of at least one field due to the authorization label set satisfying the expression indicated by the triple corresponding to the field.

9. The apparatus as described in claim 8 wherein the apparatus at query time is to release a fieldvalue for inclusion in the response when, according to the fieldname and visibility label pairs, all of the field's labeled ancestors are releasable.

10. The apparatus as described in claim 8 wherein the instructions further cause the apparatus to:
  decompose the query into a function that determines which of a set of one or more fields in the hierarchical document should be included in the response, and one or more sets of authorizations that determine which of the set of one or more fields are allowed to contribute to the response.

11. The apparatus as described in claim 8 wherein the instructions further cause the apparatus to derive the index from the set of one or more triples, the index comprising a set of index entries, each index entry containing a visibility label that is identical to the visibility label in the triple from which it was derived.

12. The apparatus as described in claim 11 wherein the index is one of: a forward index, an inverted index, and a numerical range index.

13. The apparatus as described in claim 8 wherein the data store in a NoSQL database, and wherein the hierarchical document is one of: a JSON document, and an XML document.

14. A computer program product in a non-transitory computer-readable medium to provide policy-based access control in association with a sorted, distributed key-value data store, the computer program product including computer program instructions which, when executed by one or more processors of a device, cause the device to perform operations comprising:
  as data representing a hierarchical document identified by a unique identifier is ingested into the data store,
    identifying fields and any subfields in the hierarchical document;
    translating each identified field and its associated protection level as identified in the hierarchical document into a set of one or more triples, each triple having a fieldname identifying a field and its zero or more ancestor fields, a fieldvalue, and a visibility label that indicates an expression based on a protection label of the field and protection labels of any ancestor fields of the field; and
    store in the data store the set of one or more triples or an index derived from the set of one or more triples;
  in response to receipt of a query associated with the hierarchical document, the query including an authorization label set, applying the visibility labels against the authorization label set to control which fields in the hierarchical document are retrieved; and
  returning a response to the query, the response including the fieldvalue of at least one field due to the authorization label set satisfying the expression indicated by the triple corresponding to the field.

15. The computer program product as described in claim 14 wherein the operations further include at query time releasing a fieldvalue for inclusion in the response when, according to the fieldname and visibility label pairs, all of the field's labeled ancestors are releasable.

16. The computer program product as described in claim 14 wherein the operations further comprise:
  decomposing the query into a function that determines which of a set of one or more fields in the hierarchical document should be included in the response, and one or more sets of authorizations that determine which of the set of one or more fields are allowed to contribute to the response.

17. The computer program product as described in claim 14 wherein the operations further comprise deriving the index at least in part from the set of one or more triples, the index comprising a set of index entries, each index entry containing a visibility label that is identical to the visibility label in the triple from which it was derived.

18. The computer program product as described in claim 17 wherein the index is one of: a forward index, an inverted index, and a numerical range index.

19. The apparatus as described in claim 14 wherein the data store in a NoSQL database, and the hierarchical document is one of: a JSON document, and an XML document.

20. The method as described in claim 1 wherein the distributed key-value data store is implemented using a cluster of computing devices in a cloud-based network, and wherein a query layer that receives the query and sends the response to the query is provided as a web service in the cloud-based network.

* * * * *